United States Patent [19]

Alber

[11] 4,180,429
[45] Dec. 25, 1979

[54] APPARATUS FOR MANUFACTURING THIN-WALLED PLASTIC HOSES

[75] Inventor: Tassilo Alber, Steinbach, Fed. Rep. of Germany

[73] Assignee: Vohran Kunststofferzeugnisse GmbH, Steinbach, Fed. Rep. of Germany

[21] Appl. No.: 865,388

[22] Filed: Dec. 29, 1977

[30] Foreign Application Priority Data

Jan. 3, 1977 [DE] Fed. Rep. of Germany ....... 2700056

[51] Int. Cl.² .............................................. B31C 13/00
[52] U.S. Cl. .................................... 156/425; 156/143; 156/145; 156/428; 156/431; 156/500
[58] Field of Search ............... 156/143, 144, 149, 244, 156/423, 428, 429, 431, 443, 500; 425/72 R, 113, 114, 133.1, 381.2, 387 R, 392, 393, 460, 461, 445; 264/88, 93, 99, 209

[56] References Cited

U.S. PATENT DOCUMENTS

| 2,570,929 | 10/1951 | Fitch et al. | 156/428 |
| 3,289,250 | 12/1966 | Zernay | 425/113 |

FOREIGN PATENT DOCUMENTS 2249484 5/1974 Fed. Rep. of Germany ........... 425/113

*Primary Examiner*—Caleb Weston
*Attorney, Agent, or Firm*—Cooper, Dunham, Clark, Griffin & Moran

[57] ABSTRACT

A method and apparatus for continuously manufacturing thin-walled flexible hoses having helical reinforcement members which are relatively strong in relation to the hose walls wherein an internal pressure is applied to the hose core to obviate the need for a manufacturing mandrel, and a plurality of turns of the reinforcement member are coiled onto a fixed tube through which the hose core passes and the successive comparatively unstressed turns of the reinforcement member are applied to the slightly expanding hose core at the tube exit by the application of an intermittent pressure in an axial direction against the respective last turn of the plurality of turns on the tube.

13 Claims, 5 Drawing Figures

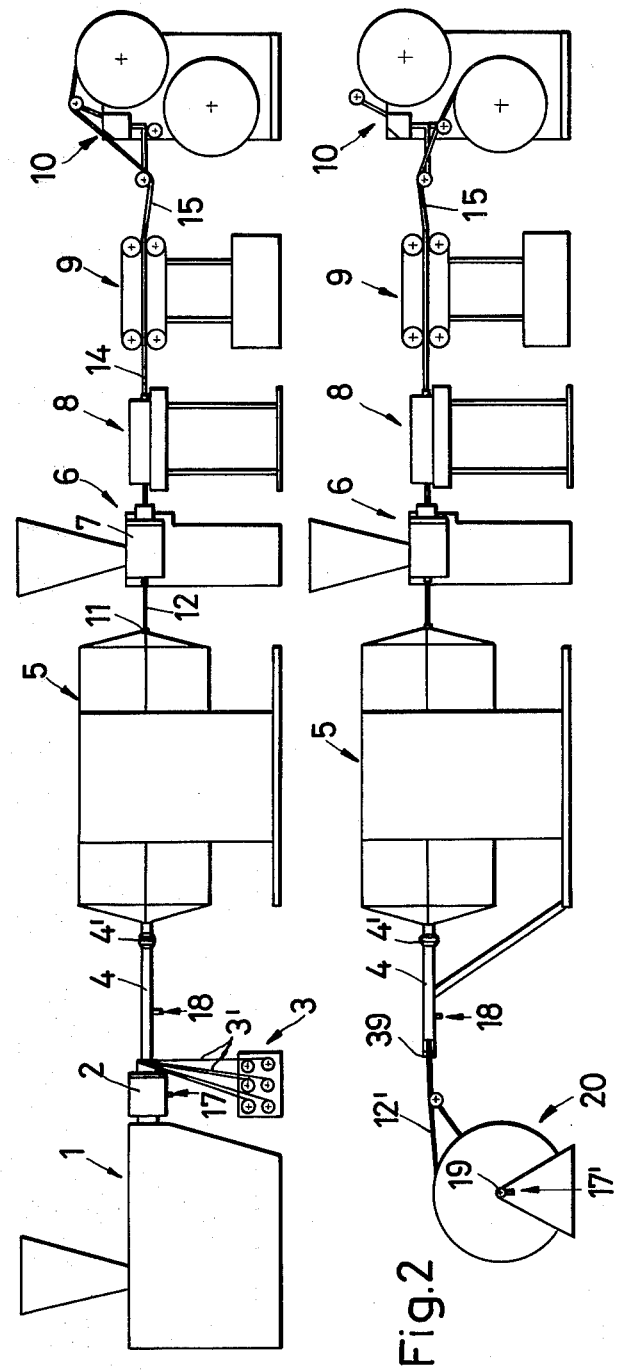

APPARATUS FOR MANUFACTURING THIN-WALLED PLASTIC HOSES

BACKGROUND OF THE INVENTION

The present invention relates to a method of and means for manufacturing thin-walled hoses, and more particularly, to hoses made from synthetic plastic material, with a reinforcement which is strong relative to the wall thereof.

The trend as regards the development of hoses has recently been to manufacture very light and extremely flexible hoses having walls which are as thin as possible but which are strongly reinforced by a helical wire, such as those which are, for example, described in German Pat. No. 2,261,126.

It has so far been necessary for such hoses to be manufactured on production auxiliary mandrels, also known as support mandrels. This operational procedure has been necessary in order that the soft and sensitive hose core, at the time of applying the strong reinforcement, not be constricted or compressed under the prevailing coiling tension.

The commercial disadvantages as regards manufacture using auxiliary mandrels during production are serious. It is only possible to produce hoses of finite length, the limit of which at the present time may be in the region of 15 meters. However, industry requires greater lengths, for example, up to 100 to 150 meters. Another disadvantage as regards production on mandrels is apparent from German Offenlegungsschrift No. 2 608 94. It is clear from that disclosure the great expense necessary in order to make such a manufacture economic. Apart from the expense involved in such a manufacture, it is also necessary to take into account the area or space which is needed in respect of this installation.

An additional disadvantage with the manufacture on mandrels is the type of reinforcement which may possibly be applied. With hoses having opposite coils or turns, it is scarcely possible, or only with very great difficulty, for them to be freed from the auxiliary mandrels used during production. However, an oppositely directed reinforcement has the great advantage, as regards pressure loading of the hoses, that the said hoses are not distorted or twisted under the prevailing internal pressure. Radial reinforcements which extend in one direction yield under the prevailing internal pressure and thus lead to twisting or distortion of the hoses themselves, and this may, with loose hoses, lead to the formation of loops. This is a serious disadvantage, for example, with long hose pipes for compressed air. Furthermore, the conversion of such an installation to other hose diameters is very costly. Many devices have to be changed or replaced such as the drawing devices and devices for cutting to length, the storage arrangements and mandrels, etc.

It is known that hose cores having relatively thick walls are at the present time made, for example, with thin textile reinforcements, usually in the form of polyester filaments, without the use of support mandrels, as in shown from German Pat. No. 1 435 237, and that hoses which are coiled from strips and welded are occasionally produced, likewise without using production auxiliary mandrels.

However, when starting with thin-walled hose cores which are initially extruded axially, due to the fact that said cores at the present time mostly consist of synthetic thermoplastic material having a Shore hardness A of approximately 70, or of comparable equally soft rubber, it has not so far been possible thereafter to apply a strong reinforcement without the aid of support mandrels.

Previously, for example, with a finished hose having an external diameter of 15 mm and a reinforcement of polyethylene or hard PVC with a diameter of 1.5 mm, even in conjunction with the aforementioned measures of reducing the coiling tensions to a minimum, the limit of the formation without using auxiliary mandrels during production would be a hose core having a wall thickness of about 1.5 mm, which core must, however, be cooled beforehand to at least room temperature. This specific example only applies when the hoses are made with the modern improved coiling machines, which have electronically controlled winding drive units in addition to the main driving means, and not when other hose diameters are involved. In this case, it is always necessary to consider the relation between the reinforcement and the hose core which is to be reinforced.

Hoses, such as those which are, for example, described in the aforementioned German Pat. No. 2,261,126, generally require smaller wall thicknesses of their hose core and sheathing. Such a completed hose, with an external diameter of about 15 mm, is most advantageously given a hose core and sheathing with a thickness of only 0.5 mm, so as to function satisfactorily.

In the manufacture of hoses with coiled reinforcement, attempts have been made to reduce the coiling tension by using a guide means through which the hose is guided. The reinforcement is coiled upon the guide means in a manner so that the last turn coiled on the guide means will cause the first turn to be transferred to the hose and to be conveyed further by said hose, as shown, for instance, in DT-PS No. 1,435,257 and DT-OS No. 2,502,363. This manner of reducing the coiling tensions is, however, dependent on the tension in the reinforcing material as well as on the friction between said material and the guide means and the friction between adjacent turns on the guide means, which effects are adversely affected by a rotatable pusher element, as indicated in said DT-OS No. 2,502,363. The fact that the reinforcing material obtained from a respective bobbin will already be subject to variable tensions, constitutes one cause for variable friction forces on these guide means. Accordingly, by these known methods it is not possible to really obtain uniform coiled reinforcements.

It is an object of the present invention to provide a method and means for readily forming thin-walled hoses composed of a hose core of soft synthetic plastic under 0.5 mm thickness united with a strong reinforcement in the form of monofilaments and strips to several millimeters thickness without production auxiliary mandrels being required during the manufacturing process.

SUMMARY OF THE INVENTION

This object is achieved according to the invention by a method of continuously producing thin-walled hoses, more especially synthetic plastic hoses, having a relatively strong coiled reinforcement, wherein the reinforcement is fed to an advancing hose core and guided onto its circumference after leaving a guiding means. A number of turns of the reinforcement are coiled onto the guiding means and successive leading turns of the reinforcement coil are supplied to the external surface of the hose core by applying an intermittent pressure in an axial direction against the last turn of the coil causing the foremost turn to leave the guide means and engage the surface of the advancing hose core. In addition, the hose core which may still be soft after extrusion is supported by the imposition of an internal pressure that is balanced by the imposition of an external pressure. A number of advantages result from these features.

Due to the accumulation of a plurality of windings or turns of the reinforcement on the guiding means, the respective foremost turn is relieved of the tangential tension of the reinforcement, and as a result, the tendency thereof to constrict the soft hose core is reduced. Further the stripping of the foremost winding or turn is affected in a particularly advantageous manner under pressure in the axial direction, rather than by a rotating pressure, so that other undesirable tangential tensions, which are a source of distortion, are completely eliminated in practice. The respective first or foremost turns of the reinforcement are thus successively pushed onto the advancing hose core and are spread in the axial direction by the forward movement of the core.

The additional feature of the present invention whereby an external pressure applying means is used for balancing the internal pressure in the hose core makes it possible for a still soft extruded hose core to be transported largely without friction and while maintaining desired dimensions even over large distances with an internal pressure which otherwise could not be supported by the core. The hose core is thus guided pneumatically without friction or resistance, eliminating any danger of deformation due to different frictional effects on the wall of the hose.

Preferably the external pressure is applied to the hose core until it reaches the approximate position where the reinforcement is received on the external surface whereupon the continuously-maintained internal pressure not only acts in the manner of a pneumatic support mandrel, but also produces an adaption of the hose core to the reinforcement. The slight expansion of the core at this position simultaneously causes a good sealing effect overcoming the problem of any existing annular space between the guiding arrangement accommodating the coils or turns of the hose core until the external pressure is reestablished thereon.

An improved means for carrying out the method according to the invention is also presented. In order to assemble the plurality of turns or coils of the reinforcement before the foremost turn is delivered to the hose core, a special guiding device is provided. This guiding device surrounds the hose core before the reception of the reinforcement and must be of a sufficient length to accommodate several turns of the reinforcement, one behind the other, from the point where the reinforcement is received on its surface and up to the point where the foremost coil or turn is delivered to the hose core. In accordance with the invention, it is important that these turns or convolutions of reinforcement are not pushed forward by any rotating force, but that the advancing movement be directed in a strictly axial manner, so that no tangential stresses are induced into the reinforcement turns which could cause a constriction of the hose core.

A compact structural arrangement which is particularly advantageous and economical as regards space is made possible according to the invention through the use of a fixed central tube within a central coiling unit, which tube also acts as a pressure chamber for the external pressure to be applied to the hose core. The central tube extends as far as the extrusion head of an extruder producing the hose core. In this manner the freshly extruded and still warm and pliable hose core may be immediately fed gently and even with a high internal pressure through a region, containing a temperature control means if desired, to the central coil winder for the application of the reinforcement.

A further important advantage of pneumatically guiding the hose core is the fact that it is possible to easily and inexpensively select and vary the diameters of the hose or of the core to be manufactured, since, in contrast with known mechanical external guiding means, the diameter is not necessarily fixed by the particular machine part dimensions when pneumatic guiding is effected.

BRIEF DESCRIPTION OF THE DRAWINGS

The invention is hereinafter more fully explained by way of example with reference to the drawings, wherein:

FIG. 1 illustrates diagrammatically the construction of a complete installation for the manufacture of reinforced hoses, starting from an extruder for the hose core;

FIG. 2 illustrates an installation corresponding to that of FIG. 1, for the case where a pre-fabricated hose core is used, instead of an extruder;

DETAILED DESCRIPTION OF PREFERRED EMBODIMENTS

Figure 3:
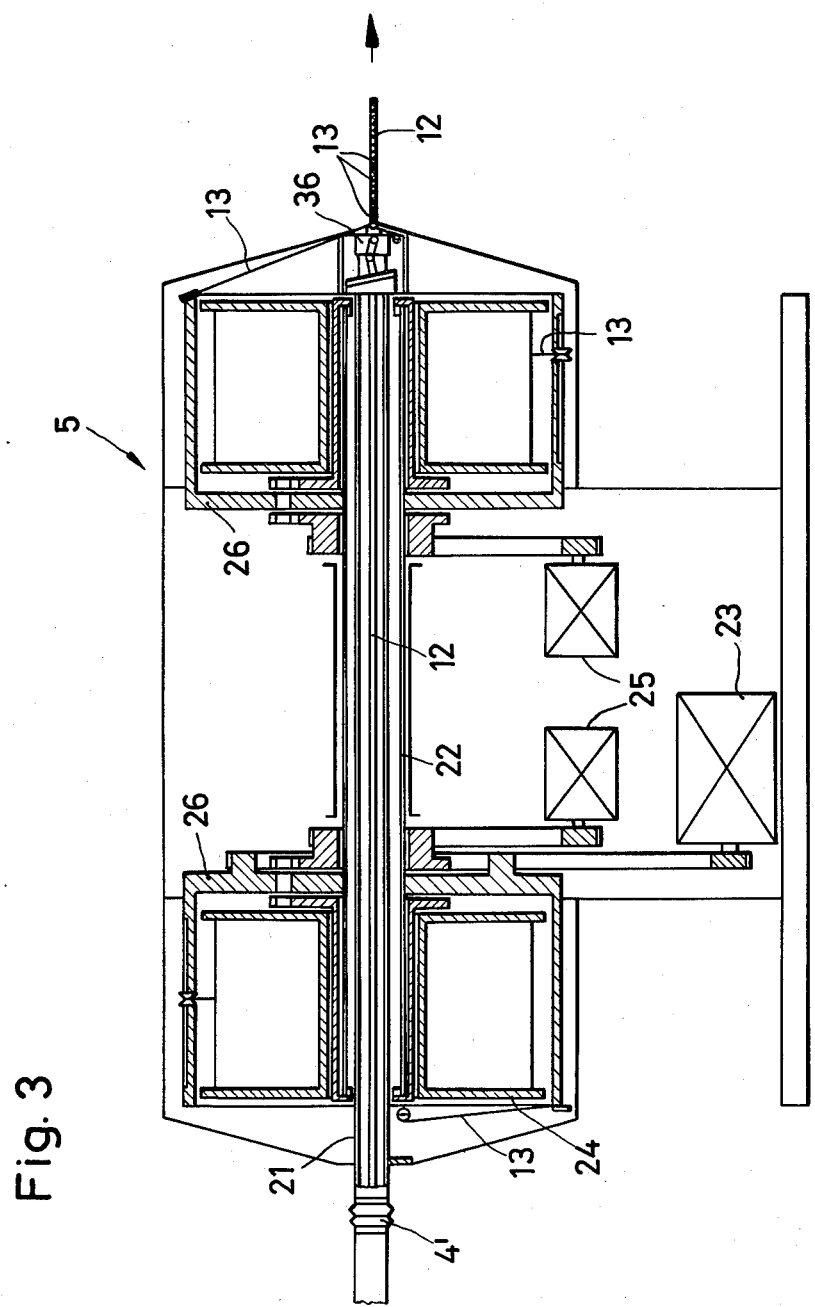
FIG. 3 is a longitudinal section through the central coil winder shown in FIGS. 1 and 2.

The construction of an installation in accordance with the present invention is shown diagrammatically in FIG. 1. At the starting end is a first extruder 1 with a straight extrusion head 2 having, disposed therebeneath, a supply device 3 for optional axial reinforcing filaments 3'. Connected to head 2 is a counterpressure chamber 4 and a central coil winder 5. Following this arrangement is a second extruder 6 with a transverse extrusion head 7, a cooling arrangement 8 having a short axial length, a withdrawal unit 9, and a final hose reel 10, in place of which may also be disposed a length-cutting device. A resilient coupling 4' is connected between two sections of the counterpressure chamber 4.

The installation according to FIG. 1 functions in accordance with the following procedure. The first extruder 1 extrudes the hose core, which with particular advantage may also be provided in the extrusion nozzle with axial reinforcing filaments 3'. Simultaneously, the hose core has applied thereto the same air pressure, both from inside by the straight extrusion head 2 in known manner and from outside by the counterpressure chamber 4 which extends from the extrusion head 2 through the coil winder 5. Consequently, up to the outlet from the central coil winder 5, and in fact up to the position 11 where the reinforcement coil 13 is directly applied (see FIG. 3), the wall of the hose core is under a relative pressure of zero. The application of the internal pressure to the hose core is necessary to support the extruded material and in addition has the effect that the hose core conforms to the reinforcement 13 at the coiling point 11. If one were to operate in the region before the winding or coiling point without counterpressure, the still pliable plastic hose core, due to the prevailing necessary internal pressure, would expand on leaving the extrusion nozzle to the point of bursting. Calibrations in the form of supporting pipes are, of course, known, which support the hose core on its external circumference. However, these pipes have the disadvantage that they must be kept relatively short, since otherwise the frictional resistance increases to a point which interferes with the production. As a result, obstructions occur and, in the most unfavorable case, the friction exceeds the strength of the extruded material. Accordingly, such calibrating arrangements are strongly cooled and are only made of such a length that they are just sufficient for cooling the profile to be manufactured, so that the said profile withstands the working pressure which is necessary for the further production steps.

Tests have continuously shown that a reliable operation with such sensitive hose cores is only guaranteed if every possibility of friction is avoided. However, if the internal pressure of the hose core is compensated for with an external and equally strong counterpressure up to the point of applying the reinforcement, any possible friction is avoided and production can take place without any disruption. The operating procedure as here discussed, with a relative pressure loading of the hose core of zero up to the point of winding or coiling, also permits the transporting of the uncooled hose core as far as the coiling point 11, which is very advantageous, because the adhesion of the individual hose formations on one another is assisted. Depending on requirements, the counterpressure chamber may in addition be temperature-controlled. In this way, it is possible in a simple manner to provide a required temperature level of the hose core, even over relatively long distances.

Depending on the material of the hose, the working temperature, and the internal diameter, the necessary working pressure in the hose core varies between 0.2 and 3 bars. The counterpressure is controlled with the assistance of the measuring and regulating units which are conventional in the art at the present time, the working pressure inside the hose core forming the rated value and being constantly adjusted to the required value. The rated or nominal value can be derived both by way of the straight extrusion head directly in the hose core or indirectly by scanning the external circumference of the core with suitable means (such as shown at 29 in FIG. 4) and then transmitted to the regulating unit.

After leaving the central coil winder 5, the hose core 12, now externally supported by the reinforcement 13, travels at the second extruder 6 through the transverse extrusion head 7 and is provided with a sheathing 14. Following immediately thereafter is a short travel through the cooling arrangement 8, the only function of which is to cool the sheathing or covering to such an extent that it is not damaged by the following withdrawal unit 9. In the last section, the now completed hose 15 can be coiled by means of the hose coiler 10 into coils, as represented in FIG. 1, or it may be fed to a length-cutting device instead of the coil winder, as will be understood by those skilled in the art.

In the case where the hoses are to be manufactured without any sheathing or covering, the extruder 6 with the transverse extrusion head 7 is omitted, but the following arrangements 8, 9 and 10 are retained.

FIG. 1 additionally shows on the straight extrusion head 2 a feed union for applying the internal pressure of the hose core in the direction of the arrow 17 and, on the counterpressure chamber 4, a feed or supply union for applying the external pressure, i.e. the pressure in this chamber, in the direction of the arrow 18.

FIG. 2 shows a modified embodiment of the arrangement according to FIG. 1, both of these figures also illustrating the corresponding methods or procedures.

Represented by the arrangement as illustrated in FIG. 1 is a standardized, self-contained manufacture, which carries out all necessary working steps in sequence and continuously to the stage of the completed hose. In practice, however, the case may also arise in which, for example, for the manufacture of hoses of small cross section, the existing extruders may only be able partially to utilize their output capacity or it may be desired to produce a hose of complex structure from various materials, e.g., a soft rubber core, with a reinforcement and sheathing of soft PVC. In such cases, the production of the hose cores may be separated from the installation of FIG. 1. In the under-utilized case, the hose core extruder operated separately is then able to supply the hose cores for several installations and is thus able to operate more economically. In the second case, in accordance with FIG. 2, the possibility exists of starting from prefabricated soft rubber cores, which have been prefabricated by appropriate rubber-processing firms with installations which are necessary for the processing of rubber. The installation of FIG. 1 is substantially retained in the arrangement shown in FIG. 2, except for the first extruder 1. Provided in place of the first extruder is a supply reel arrangement 20 for the prefabricated hose core 12'. It is also advantageous in this case to operate with a counterpressure chamber 4.

The counterpressure chamber and all following devices correspond to those shown in FIG. 1. The counterpressure chamber 4 makes possible the frictionless travel of the hose core at the points of constriction and also any heating which may possibly be necessary. The pressure buildup inside the hose core can be effected both through the finished hose from the forward end and also through the end of the prefabricated hose core from the rearward end, by means of normal commercial, rotatable feed devices 19 with compressed air in the direction of the arrow 17'. The determination of the nominal value for regulating the counterpressure is advantageously carried out in this case indirectly by scanning the external circumference of the hose core in the counterpressure chamber 4. Should it happen that the free hose core 12' still situated in front of the counterpressure chamber does not maintain the necessary, internal working pressure, then the building up of pressure is effected exclusively from the side of the finished hose, the hose core then being directly squeezed, on entering the counterpressure chamber, for example, by rollers 39, so that the progagation of the pressure into the unsupported hose core is avoided. It is obvious that, in all cases, the open end of the hose must be suitably closed off.

Figure 4:
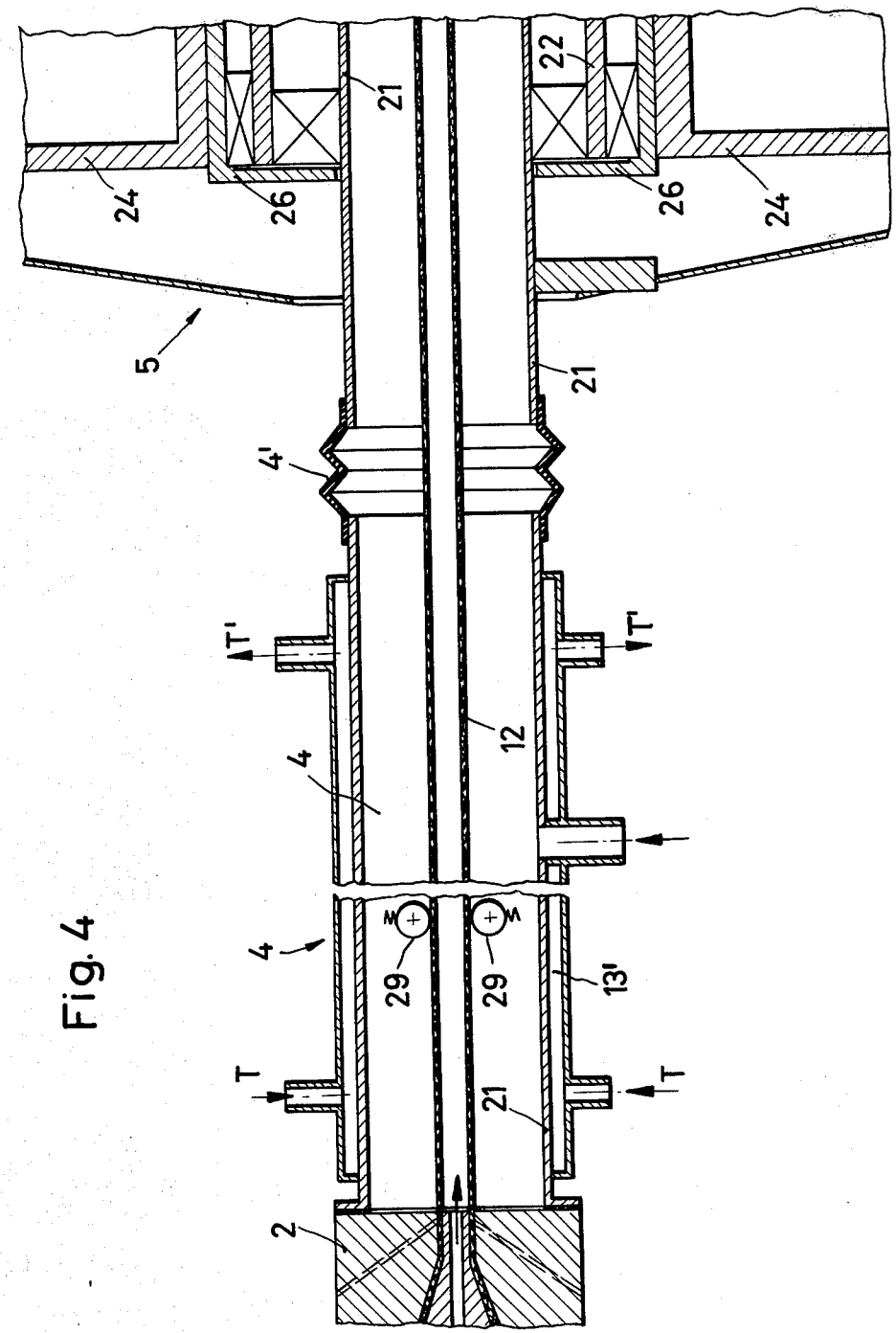
FIG. 4 is a longitudinal section through the connection between the extruder and central coil winder shown in FIG. 1.

FIG. 4 shows diagrammatically the arrangement and the construction of the counterpressure chamber 4. It is arranged hermetically and well-insulated on the straight extrusion head 2 of the first extruder 1 and is advantageously made so that it can be hinged in order to facilitate the assembly of the apparatus. It is also provided with the elastic connection 4' for ready connection with the central tube 21 of the central coil winder 5. This connection is advantageous, because oscillations of the separate parts of the apparatus are not thereby transmitted to other parts. A temperature-control chamber 13' can also be seen, which chamber provides for a constant temperature control of the hose core and can be supplied with a suitable medium by way of supply and discharge pipes according to the arrows T, T'.

FIG. 3 shows in detail the construction of the central coil winder 5. The wall of the counterpressure chamber 4 is formed by a fixed central tube 21, which extends axially through the central coil winder 5 to the vicinity of its forward end. Rotatably mounted on the tube 21 is a hollow shaft 22, which is driven with a constant speed of rotation by an electrical driving unit 23. Rotatably mounted on the hollow shaft 22 are two supply reels 24 for the reinforcement material. The supply reels 24 individually have separate electrical drive means 25, which are controlled through compensating slides arranged on rotors 26 from which the reinforcement 13 is to be unwound. In this case, a minimum coiling tension is used from the outset, since the force necessary for the unwinding operation and also the upward travel and discharge from the central coil winder is derived from the drive means 25, and no longer has to be applied, as was usually the case hitherto, by the reinforcement itself. However, residual coiling tensions still remain and are only completely removed in the forward region of the coil winder 5, before the reinforcement 13 reaches the hose core 12. This residual coiling tension is caused by the friction of a plurality of deflections which occur up to the point of coiling 11 and also by the deformation work, which is required in order to deflect the reinforcement and, to a smaller degree, by the movement of the compensating slide for the electronic control of the separate reel-driving means 25.

Figure 5:
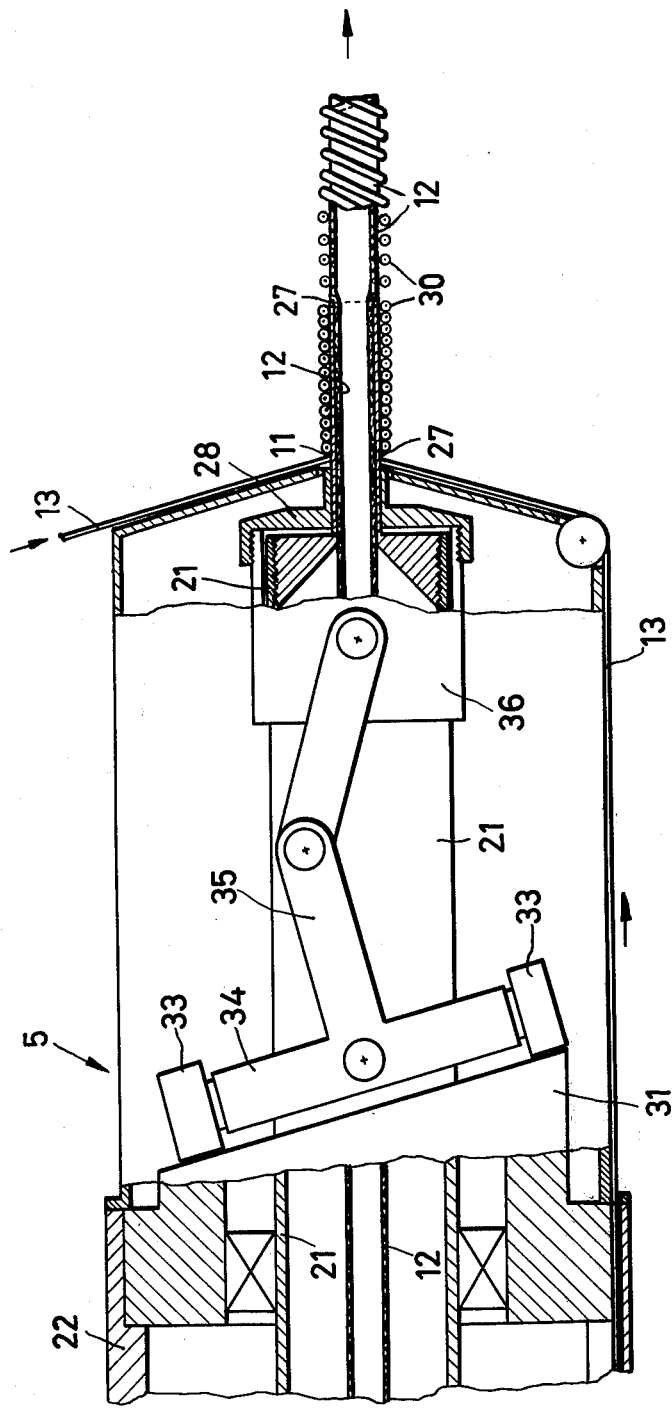
FIG. 5 shows the forward region of the central coil winder of FIG. 3, broken away and partly in longitudinal section.

Represented in FIG. 5 is the functional procedure and the construction of this forward region with a guiding means, here designated as a precoiling sleeve 27, and a ram 28 which is only movable axially. The precoiling sleeve 27 is arranged in a fixed position and forms the outlet of the central tube 21, which is also made so as to be fixed. The cylindrical precoiling sleeve 27 accommodates a plurality of turns or convolutions 30 of the reinforcement 13. Experience shows that from six to ten turns of each individual reinforcement is desirable, so that the coiling tension which still exists is compensated for by the friction being established. As soon as the total length of the precoiling sleeve is filled with the closely juxtaposed turns of the reinforcement, the pulsating and non-rotating ram 28 pushes the turns, which are completely free from tension in a radial and tangential direction, onto the hose core 12 issuing through the precoiling sleeve 27. The internal pressure in the hose core, initially operative at this point, presses the said core onto those convolutions which actually become free. The spacing of the convolutions or turns is determined by the withdrawal speed of the arrangement 9 and the speed of rotation of the coil winder 5.

Features which are important in this operation are the axially intermittent operation of the ram and its non-rotating arrangement. The convolutions or turns 30 which are on the precoiling sleeve 27 are thus subjected to a sliding friction during the stripping-off operation and are consequently very unstable in a tangential direction. Other stripper devices, for example, in the form of a screw-thread which would rotate with the hollow shaft 22, exert a tangential force on the sliding convolutions, which force undesirably acts in the same direction as the coiling tension of the reinforcement. The consequence is inevitably a slipping of the reinforcement turns or convolutions in the region of the precoiling sleeve, which has a very serious adverse effect on a thin hose core which, mechanically, is incapable of being stressed tangentially and radially.

With the ram 28 whose pulsating action is non-rotating and operates intermittently in the axial direction, the convolutions 30 which are to be stripped off are guided in a tangential direction by the bearing pressure of the ram against the last convolution and, due to the friction thereby established, strictly rectilinearly against said convolution. It thus becomes possible to produce a reinforcing coil which is completely free from tension tangentially and radially and as a result to provide even sensitive hose cores with a relatively strong reinforcement without the aid of support mandrels.

One of the many possible methods of operation as regards the ram 28 will be understood by reference to FIG. 5. An annular swash plate 31 connected to the rotating hollow shaft 22 forms the running track of two cam rollers 33. The cam rollers are seated, offset by 180°, on the outer circumference of another ring 34, which is mounted on the central tube 21 to be swivelable about its axis at right angles to the axis of the cam rollers 33. This ring 34 also has rigidly fixed thereon two elbow levers 35, which in their turn, with the rotation of the said ring 31, impart an axial pulsating movement to a guiding bush 36. On the end of bush 36, disposed in the direction of production, is seated the ram 28. With this arrangement, two strokes are completed with each rotation of the shaft 22. The length of stroke must in this case amount at least to half the width of the turns or convolutions 30 which are to be stripped off for each revolution of the shaft 22. The length of stroke may exceed, but may not fall below, this amount. A longer stroke merely means that the total length of the precoiling sleeve 27 over the increased travel is used to a lesser degree. With very stiff or rigid reinforcements and with those having a very low coefficient of friction, it may additionally be advantageous for the precoiling sleeve to be formed with slight, sharp-edged protuberances extending axially on its external circumference, so that additional safety as regards a tangential slipping of the turns 30 is obtained.

As described above, such a precoiling sleeve having an axially movable ram enables reinforcing spirals or helices to be produced which are entirely free from tangential and radial forces and thereby enables hoses to be produced within the tolerance ranges usually at the present time without employing a supporting mandrel. Moreover, with the assistance of angular functions, it is possible for the external diameter of the precoiling sleeve 27 to be theoretically established as accurately as possible.

The reinforcing coils or turns 30 lie closely adjacent one another on the sleeve 27 and thus have a specific pitch angle which is dependent on the width of the reinforcing material. After leaving the sleeve, the turns are gripped by the hose core 12 or 12' which is adapted to expand somewhat to receive them and which is moving at a higher speed in the direction of production so that the turns are stretched axially. The axial force which is necessary for this purpose is applied by the hose core itself, or, if the operation is carried out with the initially mentioned axial reinforcing filaments 3' disposed in or on the hose core, the force is applied by these filaments. Upon this stretching of the prefabricated coils, their outer diameter is reduced in accordance with the ratio of the cosine of the pitch angle in the closely juxtaposed position and the cosine of the new pitch angle in the stretched position.

$$\frac{\cos \alpha_1}{\cos \alpha_2} = \frac{D1}{D2}$$

$\alpha_1$ = pitch angle of the tightly adjoining turns.
$\alpha_2$ = pitch angle of the stretched or extended turns.
$D_1$ = external diameter of the precoiling sleeve.
$D_2$ = external diameter of the hose core of the completed hose.
Thus, $$D_1 = \frac{D_2 \cos \alpha_1}{\cos \alpha_2}$$

Practical experiments confirm the correctness of this formula.

In those cases where, in practice, $\alpha_2$ is only insignificantly larger than $\alpha_1$, it may be possible to prefabricate the hose core in its actual finished diameter, since the diameter of the central passage of the precoiling sleeve would have to scarcely vary from the external sleeve diameter and thus the theoretical wall thickness from the above formula would not be practical for material strength reasons. Nevertheless, the precoiling sleeve can be produced with a wall thickness which is necessary for its strength at the cost of its central passage, since the hose cores used in such cases are able easily to expand to the necessary dimension under the internal pressure as already described. With the use of thermoplastic hose cores, which are only given an elastic deformation at the coiling point under the aforementioned conditions, such cores can then be heat-fixed in the expanded state in another continuous working step, within the purview of the skilled artisan, after the withdrawal unit and by means of a heating duct.

I claim:

1. An apparatus for continuously manufacturing thin-walled flexible hoses having helican reinforcement members which are relatively strong in relation to the hose walls comprising:
   supply means for continuously supplying and advancing a hose core along a predetermined path;
   means for supplying compressed gas to the interior of said hose core to create an internal pressure therein;
   counterpressure means containing compressed gas disposed along said path for substantially equalizing the pressure difference on the wall of the advancing hose core;
   means disposed along said path for coiling a reinforcement member comprising:
      fixed tube means for passing therethrough the advancing hose core coming from the supply means;
      reel means for mounting the reinforcement member thereon;
      a hollow shaft means rotatably mounted on said tube means for rotatably mounting said reel means; and
      means for driving said reel means and said shaft means to pay out and coil said reinforcement member;
   fixed guide means disposed at the exit of said fixed tube means and the coiling point of said cooling means for guiding the reinforcement member to the hose core, said guide means projecting with an axial length corresponding to the thickness of several turns of the reinforcement member beyond the coiling point such that a plurality of said turns are accumulated along the external surface of said guide means; and
   ram means for applying an intermittent pressure in an axial direction against the respective last turn of said plurality for axially displacing said turns of the reinforcement member on the guide means to successively supply the first turn thereon to the surface of said hose core.

2. Apparatus as in claim 1 further comprising drive means, for producing the intermittent axial movement of the ram means, connected to the drive means for the reel means and shaft means, and comprising a control element revolving with said shaft means, and having regions which project differently in the axial direction and cam roller means connected to the ram means for scanning said regions.

3. Apparatus as in claim 1 wherein said hose core is prefabricated and said supply means comprises a means for unreeling said hose core from a reel thereof and wherein said compressed gas supplying means comprises means connected to said unreeling means for supplying compressed gas to the interior of said unreeled hose core.

4. Apparatus as in claim 1 wherein said hose core is prefabricated and said means for supplying compressed gas supplies compressed gas to the forward end of said advancing hose core and further comprising clamping means for compressing said hose core after leaving said supply means to prevent loss of the compressed gas therein.

5. Apparatus as in claim 1 further comprising means for cooling the reinforced hose core and means beyond said cooling means for advancing said reinforced hose core.

6. Apparatus as in claim 1 wherein said supply means comprises means for extruding said hose core having a straight extrusion head and said counterpressure means comprises said fixed tube means and means connected between said extrusion head and said fixed tube means for conducting said advancing hose core under an external counterpressure to the exit of said guide means.

7. Apparatus as in claim 1 further comprising means for extruding a hose sheath having a transverse extrusion head means disposed beyond said guide means for applying a covering to the reinforced hose core.

8. Apparatus as in claim 1 wherein said counterpressure means comprises a chamber surrounding said hose core to which compressed gas is supplied in a controlled manner, said fixed tube means comprising at least a portion of said chamber to substantially equalize the pressure difference on the wall of the hose core while passing through the coiling means.

9. Apparatus as in claim 8 further comprising means for closing off said counterpressure chamber on at least one side, said closing off means enclosing the hose core in annular form and against which the wall of the hose core bears with a sealing action under internal pressure.

10. Apparatus as in claim 8 wherein said supply means comprises an extruder means for producing hose core having an extruder head and wherein said counterpressure chamber is connected on the input side and with a sealing action to said extrusion head.

11. Apparatus as in claim 8 further comprising elastic connection means for connecting said fixed tube means to the remainder of said counterpressure chamber.

12. Apparatus as in claim 8 further comprising temperature-control means surrounding at least a portion of said counterpressure chamber for controlling the temperature therein.

13. Apparatus as in claim 2 wherein said temperature-control means comprises a temperature-control chamber disposed before said coiling means and having a supply pipe and a discharge pipe for a flowing medium.

* * * * *